Oct. 20, 1964   L. ACKLIN   3,153,618
COOLING SYSTEM FOR A NUCLEAR REACTOR
Filed Feb. 28, 1961

Inventor:
LEO ACKLIN.
By K. A. Mayr
Attorney:

3,153,618
COOLING SYSTEM FOR A NUCLEAR REACTOR
Leo Acklin, Winterthur, Switzerland, assignor to Sulzer Freres, S.A., Winterthur, Switzerland, a corporation of Switzerland
Filed Feb. 28, 1961, Ser. No. 92,282
Claims priority, application Switzerland Mar. 3, 1960
9 Claims. (Cl. 176—20)

The invention relates to a cooling system for a nuclear reactor plant wherein a heat carrier describing a primary circuit surrenders the heat received from the nuclear reactor in a heat exchanger to a medium describing a secondary circuit including a heat consumer.

Nuclear reactors are known which are cooled by an inert gas flowing through a heat exchanger and yielding therein the heat received from the reactor to an operating fluid which is, as a rule, water or the vapor thereof. This operating fluid performs mechanical work in a turbine, is condensed and returned to the heat exchanger by a feed pump.

In the system according to the invention steam is used as the heat carrier circulating in the primary circuit. This steam may be wet steam in the portion of the circuit upstream of the reactor.

The system according to the invention provides considerable advantages over the known systems. For instance, steam has a greater specific heat than the inert gases. Therefore, less power is required for maintaining circulation in the primary circuit to transfer a desired amount of heat to the secondary circuit. Also steam is cheaper than the inert gases used in nuclear reactors, and small leakage losses can be tolerated provided, of course, that there is no escape of active substances. Since the same fluid is used in the two circuits, fluid can be fed in the primary circuit from the secondary circuit. To make this possible the invention provides for maintenance of a higher pressure in the secondary circuit than in the primary circuit.

Figure 1:
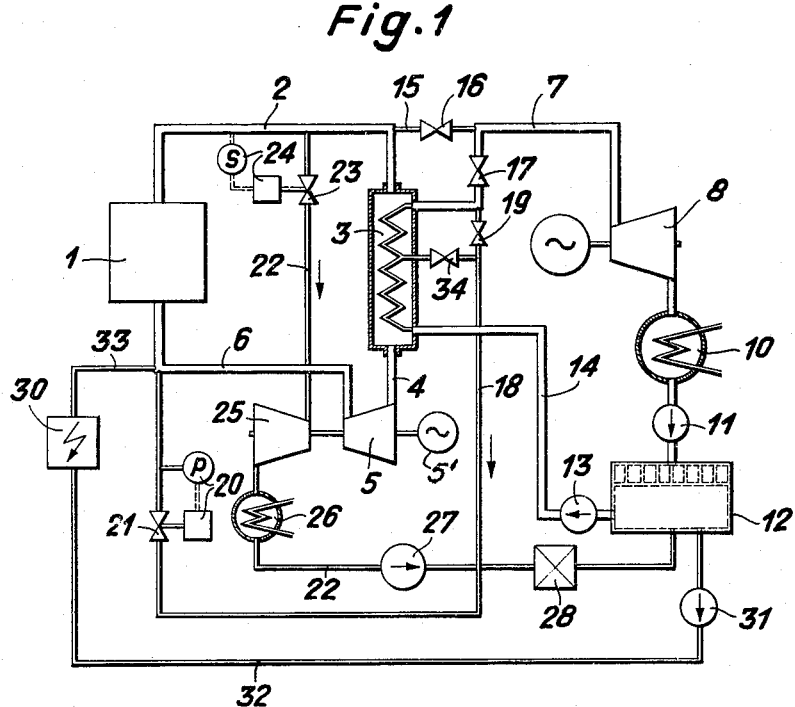

The novel features which are considered characteristic of the invention are set forth with particularity in the appended claims. The invention itself, however, and additional objects and advantages thereof will best be understood from the following description of an embodiment thereof when read in connection with the accompanying drawing, wherein:

FIG. 1 diagrammatically illustrates a cooling system according to the invention for a nuclear reactor.

Figure 2:
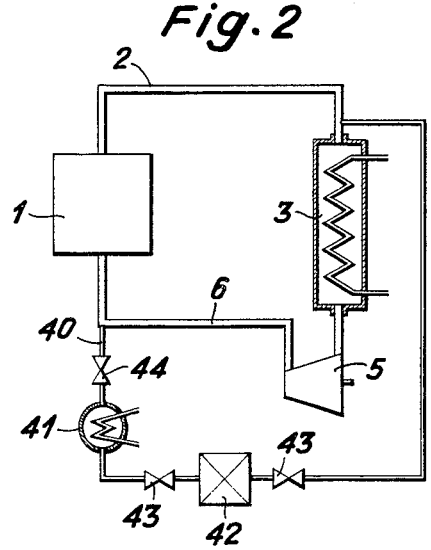

FIG. 2 diagrammatically illustrates a modified portion of the system shown in FIG. 1.

Referring more particularly to the drawing, the cooling system of a nuclear reactor 1 is connected by a pipe 2 to a heat exchanger 3 whose primary outlet pipe 4 is connected to a circulating blower 5 driven by a motor 5' for returning the primary fluid through a pipe 6 to the reactor 1. The secondary fluid, after receiving heat in the heat exchanger 3 from the primary fluid, flows through a pipe 7 to a turbine 8 and is condensed in a condenser 10, the condensate being introduced into a tank 12 by a pump 11. The operating fluid is returned in liquid state from the tank 12 through a pipe 14 to the heat exchanger 3 by a feed pump 13. For testing purposes, the pipes 2 and 7 are connected by a pipe 15 containing a throttle element 16. A throttle member 17 is interposed in the pipe 7. Operating medium may be tapped from the secondary side of the heat exchanger 3 through a valve 34 and conducted through a pipe 18, provided with a throttle member 21 controlled by a pressure regulator 20, to the pipe 6. The pipes 7 and 18 are connected by a valve 19. Steam may be tapped from the pipe 2 through a pipe 22 provided with a throttle member 23 adapted to be controlled by a signal produced by a radiation detector 24 connected to the pipe 2. The pipe 22 extends to be controlled by a signal produced by a radiation detector whose exhaust is condensed in a condenser 26. The condensate is pumped by a condensate pump 27 into a purifier or decontaminator 28 and flows therefrom to the tank 12. The water purifier or decontaminator 28 can be, for instance, a conventional ion exchanger or other device for removing salts and solids contained in the water.

An electric boiler 30 is provided for starting the plant. The boiler 30 is supplied with water from the tank 12 by a feed pump 31 and through a pipe 32. The superheated steam produced in the boiler 30 flows through a pipe 33 to the cooling system of the reactor 1.

The pipes 2, 6, the cooling system of the reactor 1 and the heat exchanger 3 form a primary circuit wherein steam is circulated by the blower 5 as a heat carrier. The steam cools the fuel elements in the reactor 1 and, in the heat exchanger 3, yields the heat received from the fuel elements to the fluid circulating in the secondary circuit. The latter consists of the pipe 7, the turbine 8, the condenser 10, the condensate pump 11, the tank 12, the feed pump 13, the pipe 14 and the heat exchanger 3. The fluid flowing in the secondary circuit is evaporated and superheated in the heat exchanger 3, performs mechanical work in the turbine 8, is liquefied in the condenser 10 and therefrom returned to the heat exchanger 3. The pressure in the primary circuit is preferably lower than the pressure in the secondary circuit. If the pressure in the primary system drops below a predetermined desired pressure, the throttle member 21 opens automatically and fluid flows from the secondary circuit into the pipe 6. The temperature of the steam entering the primary circuit can be maintained at a desired value by adjustment of the two throttle valves 19 and 34. The heat carrier fluid removed through the pipe 22 from the primary circuit is replaced through the pipe 18 by fluid from the secondary circuit.

FIG. 2 illustrates a modification of the arrangement of the purifier in the system according to the invention. In this case a condenser 41 is interposed in a pipe 40 connected to the pipe 6, the condensate flowing through a purifier or decontaminator 42 and therefrom into the pipe 2. A valve 44 is provided upstream of the condenser 41 and a valve 43 is arranged between the condenser and the purifier. The rate of flow of medium flowing through the purifier 42 can be varied by adjusting the valve 44. The latter may be controlled in the same way as the corresponding valve 23 in FIG. 1, for instance, in response to the measurements made by a radiation detecting and measuring device.

Other modifications of the arrangement of the purifier are possible without departing from the scope of the invention. For instance, the pipe 40, instead of being connected to the pipe 2, can be connected to the pipe 6, in which case a circulating pump must be interposed in the pipe 40.

The primary circuit steam which is superheated when cooling the reactor may be cooled in the heat exchanger to the state of wet steam. Some of the medium from a relatively cool part of the primary circuit may even be condensed, as in FIG. 2, and returned to the primary circuit upstream of the reactor whereby the moisture in the steam returned to the reactor is evaporated by the heat generated in the reactor.

What is claimed is:
1. A cooling system for cooling a nuclear reactor comprising:
first conduit means forming a primary circuit and including a nuclear reactor,

3

1. a heat carrier medium circulating in the form of steam in said first conduit means and being superheated in said nuclear reactor, second conduit means forming a secondary circuit separated from said reactor, an operating medium in the form of water flowing through a portion of said second conduit means and in the form of steam flowing through a second portion of said second conduit means, indirect heat exchange means interposed in said first conduit means and between said portions of said second conduit means for transferring heat from the superheated steam in the first conduit means to the water in the second conduit means for evaporating the water, a heat consumer interposed in said second conduit means for receiving heat from the evaporated water, a third conduit means interconnecting said first and said second conduit means, a second heat consumer interposed in said third conduit means, a valve interposed in said third conduit means upstream of said second heat consumer for temporarily affording flow of heat carrier medium from said first conduit means through said second heat consumer into said second conduit means, and means responsive to radiation in said first conduit means outside of said reactor and operatively connected to said valve for closing said valve upon increase of radiation in said first conduit means outside of said reactor above a predetermined value.

2. A cooling system as defined in claim 1 wherein:
   said heat consumer is in the form of a turbine,
   and a blower is interposed in said first conduit means for circulating the heat carrier medium through said first conduit means,
   said blower being connected to said turbine to be driven thereby.

3. A cooling system as defined in claim 2 wherein a condenser and a purifier downstream of said condenser are interposed in said third conduit means downstream of said turbine.

4. A cooling system for cooling a nuclear reactor, comprising:
   first conduit means forming a primary circuit and including a nuclear reactor,
   an operating medium in the form of steam circulating in said first conduit means and being superheated in said nuclear reactor,
   second conduit means forming a secondary circuit separated from said reactor,
   an operating medium in the form of water flowing through a portion of said second conduit means and in the form of steam flowing through a second portion of said second conduit means,
   an indirect heat exchanger interposed in said first conduit means and in said second conduit means for transferring heat from the superheated steam in the first conduit means to the water in the second conduit means for evaporating the water and superheating the thus produced steam,
   said second conduit means having a first part wherein the pressure is higher than the pressure in said first conduit means and having a second part wherein the pressure is lower than the pressure in said first conduit means,
   a heat consumer interposed between said first and said second part of said second conduit means for receiving high pressure steam from said first part.
   a first pipe connecting said first part of said second conduit means to said first conduit means upstream of said reactor,
   flow control means interposed in said first pipe for permitting flow of operating medium from said second conduit means into said first conduit means,
   a second pipe connecting said first conduit means downstream of said reactor to said second part of said second conduit means, and
   a valve, an expansion means, and a purifier consecutively interposed in said second pipe for affording flow of superheated steam from said first conduit means and producing useful work in said expansion means and purifying the operating medium of the first circuit before entering the second circuit.

5. A cooling system as defined in claim 4 wherein said expansion means is in the form of a turbine, a circulating blower being interposed in said first conduit means for circulating the steam in said primary circuit, said blower being connected to said turbine to be driven thereby.

6. A cooling system as defined in claim 4 wherein said first pipe is connected to said second portion of said second conduit means.

7. A cooling system as defined in claim 4:
   including means responsive to the pressure in said first conduit means and operatively connected to said flow control means for opening said flow control means when the pressure in said first conduit means drops below a predetermined value.

8. A cooling system as defined in claim 4:
   including means responsive to radiation in said first conduit means outside of said reactor and operatively connected to said valve for closing said valve upon increase of radiation in said first conduit means outside of said reactor above a predetermined value and conversely.

9. A cooling system for cooling a nuclear reactor comprising:
   first conduit means forming a primary circuit and including a nuclear reactor,
   a heat carrier medium circulating in the form of steam in said first conduit means and being superheated in said nuclear reactor,
   second conduit means forming a secondary circuit separated from said reactor,
   an operating medium in the form of water flowing through a portion of said second conduit means and in the form of steam flowing through a second portion of said second conduit means,
   the pressure in at least a part of said second conduit means being higher than the pressure in said first conduit means,
   indirect heat exchange means interposed in said first conduit means and between said portions of said second conduit means for transferring heat from the superheated steam in the first conduit means to the water in the second conduit means for evaporating the water,
   a heat consumer interposed in said second conduit means for receiving heat from the evaporated water,
   a pipe interconnecting said two conduit means,
   flow control means interposed in said pipe, for temporarily affording flow of operating medium from said second conduit means into said first conduit means, and
   means responsive to the pressure in said first conduit means and operatively connected to said flow control means for opening said flow control means when the pressure in said first conduit means drops below a predetermined value.

References Cited in the file of this patent
UNITED STATES PATENTS

| | | |
|---|---|---|
| 2,998,363 | Blaser | Aug. 29, 1961 |
| 2,998,367 | Untermyer | Aug. 29, 1961 |
| 3,028,327 | Weeks | Apr. 3, 1962 |
| 3,041,134 | Weeks | June 26, 1962 |

(Other references on following page)

UNITED STATES PATENTS

| | | |
|---|---|---|
| 3,047,479 | Young et al. | July 31, 1962 |
| 3,069,342 | Flatt | Dec. 18, 1962 |

FOREIGN PATENTS

| | | |
|---|---|---|
| 1,062,837 | Germany | Aug. 10, 1955 |
| 564,347 | Belgium | Feb. 15, 1958 |
| 797,725 | Great Britain | July 9, 1958 |
| 806,068 | Great Britain | Dec. 17, 1958 |
| 1,184,886 | France | Feb. 9, 1959 |
| 1,190,275 | France | Mar. 31, 1959 |
| 811,856 | Great Britain | Apr. 15, 1959 |
| 841,920 | Escher | July 16, 1960 |

OTHER REFERENCES

Proceedings of the Second United Nations International Conference on the Peaceful Uses of Atomic Energy, vol. 8, United Nations, Geneva, 1958. Pp 398–402, 409, 410.